United States Patent [19]
Konishi

[11] Patent Number: 4,816,897
[45] Date of Patent: Mar. 28, 1989

[54] CHROMINANCE TO LUMINANCE DELAY AND GAIN MEASUREMENT DISPLAY

[75] Inventor: Tomoo Konishi, Yokohama, Japan

[73] Assignees: Tektronix, Inc., Beaverton, Oreg.; Sony-Tektronix, Inc., Tokyo, Japan

[21] Appl. No.: 142,093

[22] Filed: Jan. 11, 1988

[51] Int. Cl.$^4$ .............................................. H04N 17/00
[52] U.S. Cl. ........................................ 358/10; 358/139
[58] Field of Search ...................... 358/10, 139, 37, 88

[56] References Cited
U.S. PATENT DOCUMENTS

| | | | |
|---|---|---|---|
| 4,635,094 | 1/1987 | Thong | 358/10 |
| 4,740,841 | 4/1988 | Slavin | 358/10 |

OTHER PUBLICATIONS

1980 Option 04–Section 3, Group 21, "Group 21 Chominance-To-Luminance Delay and Gain", (NTC Report No. 7), pp 3-63 to 3-66.

*Primary Examiner*—Tommy P. Chin
*Attorney, Agent, or Firm*—Francis I. Gray

[57] ABSTRACT

A chrominance to luminance gain and delay measurement display shows gain and delay inequalities due to differences between luminance and chrominance channels of a video device as a point within a rectangular coordinate display system with respect to established tolerance limits. An appropriate test signal having bar and modulated pulse waveforms is selected from digitized video data stored in a field store acquisition memory. Luminance and chrominance arrays are derived from the modulated pulse waveform. The center points for each array are identified and displayed as a time difference between the center points along one axis of the display and as an amplitude ratio (chrominance/luminance) between the center points along an orthogonal axis of the display. The display includes a tolerance window so that an operator can readily observe whether the chrominance to luminance gain and delay is within established tolerances.

2 Claims, 5 Drawing Sheets

CHROMINANCE TO LUMINANCE DELAY AND GAIN MEASUREMENT DISPLAY

BACKGROUND OF THE INVENTION

The present invention relates to measurement displays, and more particularly to a chrominance to luminance delay and gain measurement display for composite color video signals having a graphic display in rectangular coordinates.

In color television the video signal consists of a luminance, or brightness, component to which is added chrominance, or color, information which has been modulated onto a subcarrier frequency. The luminance and chrominance components of a video signal are not independent. The amplitude of the chrominance component must be correct with respect to the amplitude of the luminance component for the saturation of the color picture to be correct, and the delays of the two signals must be equal within small limits if color fringes due to misregistration are not to be apparent. Therefore to test the chrominance channel of a video device or system a signal that contains a luminance reference for the chrominance is essential. The various test signals developed for the testing of the relationship of the luminance and chrominance channels in delay and gain include a modulated pulse waveform and a bar waveform. The test signals are the linear sums of a luminance waveform and a 100% amplitude modulated subcarrier version of the luminance waveform.

A composite test pulse waveform is shown in FIGS. 1(a)–1(d) illustrating the effect of chrominance to luminance delay and gain upon the pulse waveform. As shown in FIGS. 1(a) and 1(b) when the chrominance gain exceeds the luminance gain the baseline of the envelope bulges downward, and when the luminance gain exceeds the chrominance gain the baseline of the envelope bulges upward. Where chrominance leads luminance the baseline of the envelope takes on the shape of a negative going sinusoid, while where chrominance lags luminance the baseline of the envelops takes on the shape of a positive going sinusoid as shown in FIGS. 1(c) and 1(d). The ideal situation is for the baseline of the envelope to be flat. However it is not possible from the waveforms shown in FIGS. 1(a)–1(d) to determine the exact amount of such gain or delay inequalities. For this purpose nomograms have been prepared as shown in FIG. 2. However the presence of chrominance-luminance intermodulation falsifies attempts to use it for the measurement of gain inequalities.

What is desired is a measurement display which accurately displays the chrominance to luminance delay and gain in a video signal resulting from variations ithe luminance and chrominance channels of a video device or system in a more useful form for a user.

SUMMARY OF THE INVENTION

Accordingly the present invention provides a chrominance to luminance delay and gain display having a rectangular coordinate system that displays gain and delay inequalities between luminance and chrominance channels of a video device or system as a point with respect to ideal and tolerance values. A portion of the data containing an appropriate test signal having a modulated pulse waveform and a bar waveform is acquired and selected for processing. If there are multiple lines of test signals, then the lines are averaged for the pulse waveform. A luminance array is obtained from the pulse waveform. The blanking and bar waveform top levels are measured. The position of the pulse waveform is accurately determined. A chrominance envelope array is obtained from the pulse waveform, and reference positions on either side of the pulse waveform are determined based upon the fifty percent down points on the chrominance envelope. The center position of the chrominance pulse is determined. Likewise for the luminance array residual subcarrier, if any, is removed and the center of the luminance envelope is determined. The difference in time between the center points of the luminance and chrominance envelopes determines the differential phase, and the difference in amplitude at the center points determines the gain differential. The resulting display features a rectangular window having nominal lines for zero chrominance to luminance delay and gain together with a rectangular tolerance box representing a region of allowable deviation from the nominal. The actual chrominance to luminance delay and gain is displayed as a point within the window with the vertical coordinate representing percent amplitude for gain and the horizontal coordinate representing time for delay. The objects, advantages and novel features of the present invention are apparent from the following detailed description when read in conjunction with the appended claims and attached drawing.

DESCRIPTION OF THE PREFERRED EMBODIMENT

Figure 1A:
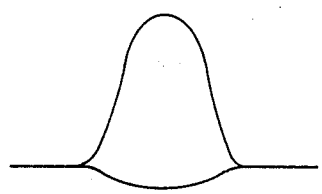
FIGS. 1(a)–1(d) illustrate the effect of chrominance to luminance gain and delay upon a modulated pulse waveform test signal.
Figure 1B:
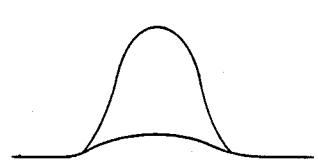
Figure 1C:
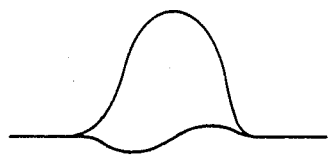
Figure 1D:
Figure 2:
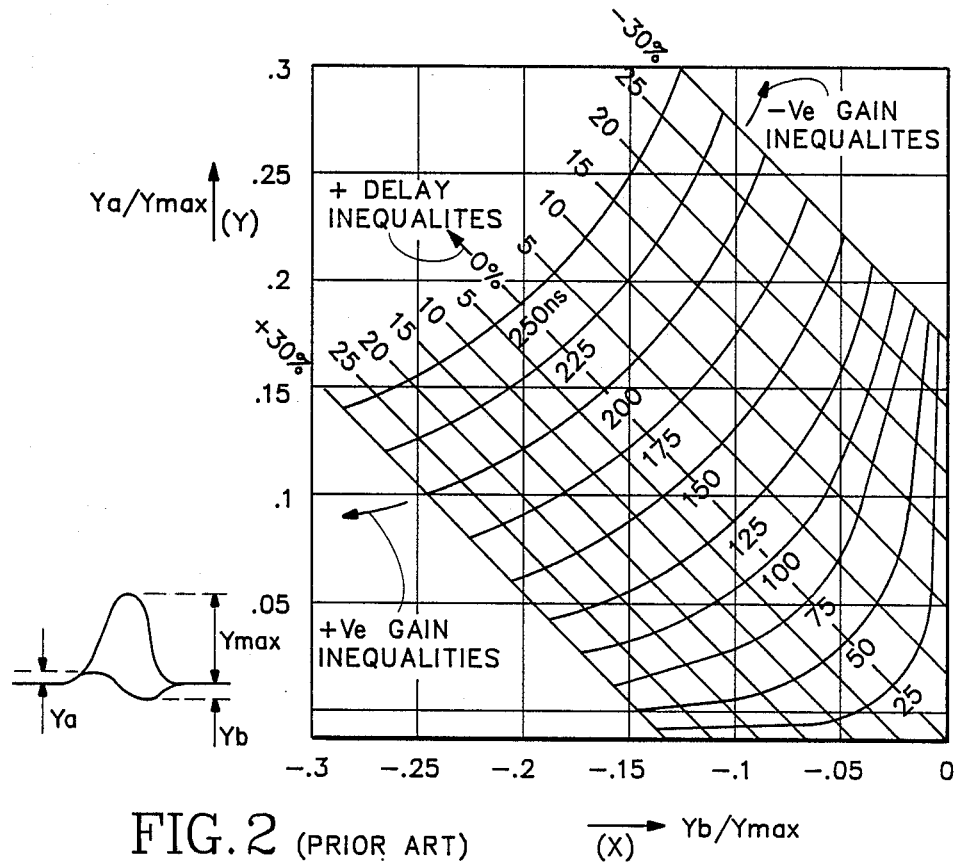
FIG. 2 illustrates a nomogram used to determine measured values for the chrominance to luminance gain and delay according to the prior art.
Figure 3:
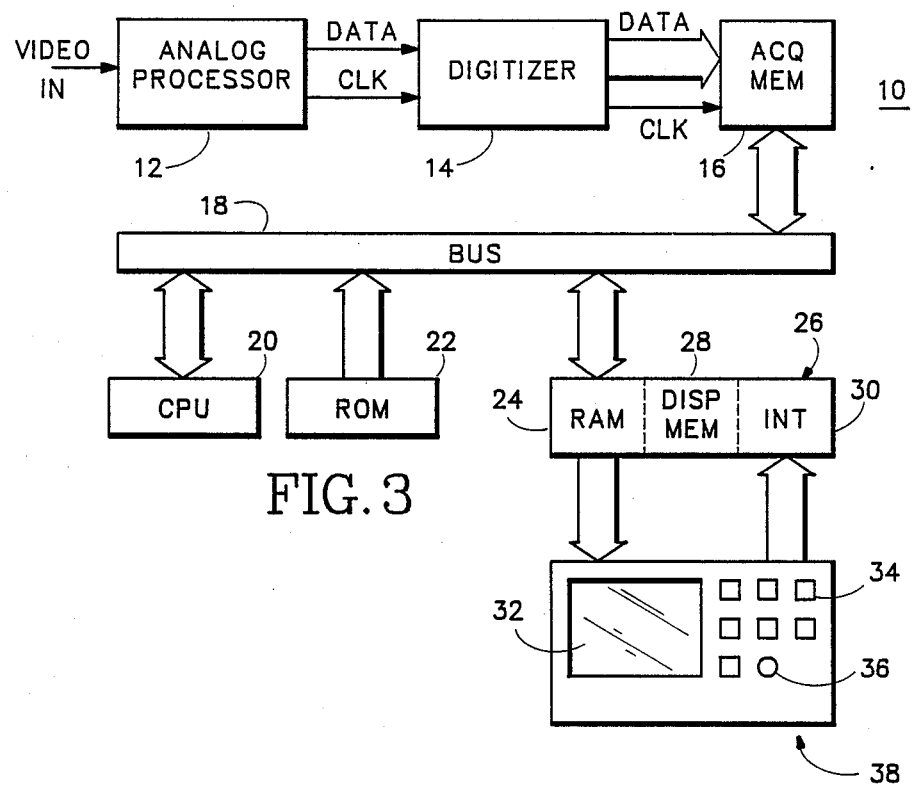
FIG. 3 is a block diagram view of a measurement test instrument which uses the chrominance to luminance delay and gain measurement display method of the present invention.

Referring now to FIG. 3 a signal, such as a composite color video signal, is input to an analog processor 12 which provides data and clock signals to a digitizer 14. The digitized data is stored in an acquisition memory 16 under control of the clock signals. The acquisition memory 16 communicates over a bus 18 with a central processing unit (CPU) 20, which may be a microprocessor, which in turn is controlled by a software program stored in a program memory 22, such as a read only memory (ROM). A working memory 24, such as a read/write random access memory (RAM), receives data from the acquisition memory 16 for processing by the CPU 20 and provides an output to a display processor 26 which has a display memory 28 and an interface processor 30. The result of the CPU 20 processing of data is displayed on a screen 32, and an operator interacts with the instrument via buttons 34 and a rotary knob 36 on a front panel 38 or soft keys on the screen.

Figure 4:
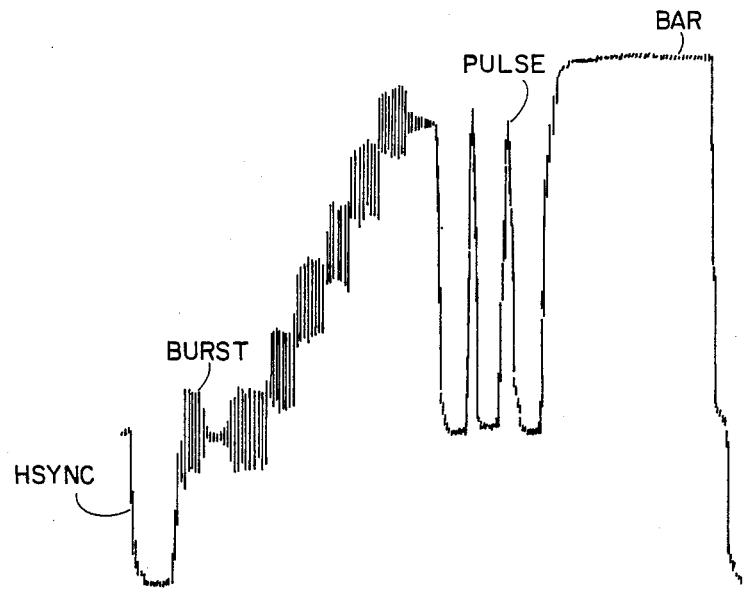
FIG. 4 is a diagram of a typical test signal used in the present invention.

There are many standard test signals which may be used to obtain chrominance to luminance delay and gain measurements. One such test signal is shown in FIG. 4. The horizontal line has a horizontal sync pulse followed by a color burst pulse. A bar waveform is included as is a modulated pulse waveform. The test signal is a combination of the chrominance subcarrier modulated one hundred percent by the luminance and of the luminance. The bar waveform may either occur prior to or after the modulated pulse waveform on the horizontal video line, depending upon the standard test signal being used.

Figure 5:
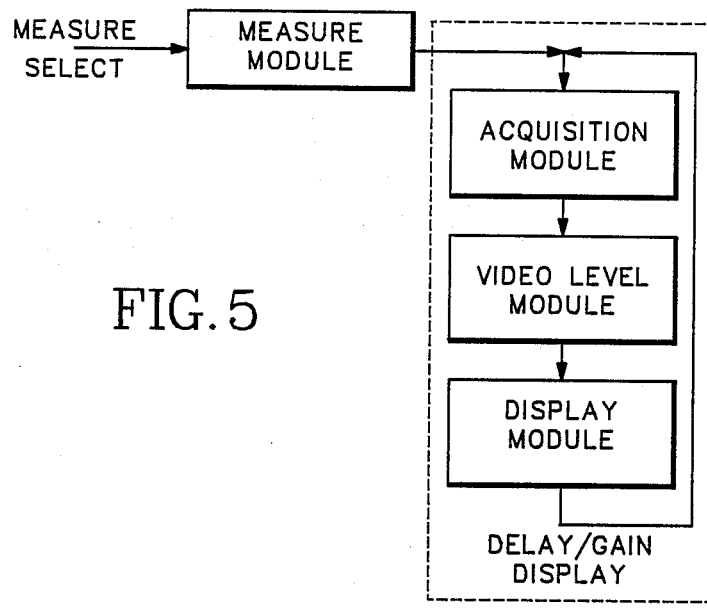
FIG. 5 is a flow chart diagram of a master measurement program for automatically executing the method of the present invention.
Figure 6:
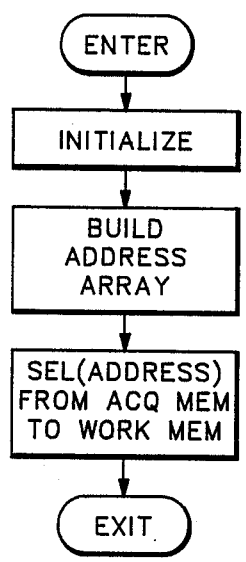
FIG. 6 is a flow chart diagram of an acquisition module for the method of the present invention.

To start a measurement sequence of the input signal a measurement main program, as shown in FIG. 5, is accessed by the CPU 20 from the ROM 22. The particular measurement test called out by the measurement main program is determined by the activation of one of the instrument front panel buttons 34 or screen 32 soft keys. When the chrominance to luminance delay and gain measurement is desired, an acquisition module is called by the main measurement program to select the appropriate data from the acquisition memory 16 for transfer to RAM 24 for processing. The data is stored, for example, as 10-bits with two added bits, a frame bit and a horizontal sync bit. The two added bits are added to the data prior to storage in the acquisition memory 16 and indicate, when set, whether the sample is the beginning of a video frame of data and/or the beginning of a video horizontal line of data. The acquisition module, as illustrated in FIG. 6, builds an address array which is one by 250 and contains the addresses for the first identified sample for each line of video data starting after the vertical interval, i.e., at line fifteen. The address array is then used to select the desired video data from the acquisition memory 16 for transfer to RAM 24. For the chrominance to luminance delay and gain measurement there are two acquisition modes depending upon the type of video signal being input. For normal video the appropriate test signal is located on a specific horizontal line of each field of the video data and occurs once per field just prior to the displayed horizontal lines of the video picture. However for testing video equipment, such as video tape recorders or the like, in a manufacturing environment the test signal could be replicated on each horizontal line of a field. An operator by manipulating the rotary knob 36 can identify a specific line containing the test signal, or can take blocks of lines at various points of the video test picture where the test signal is replicated.

Figure 7:
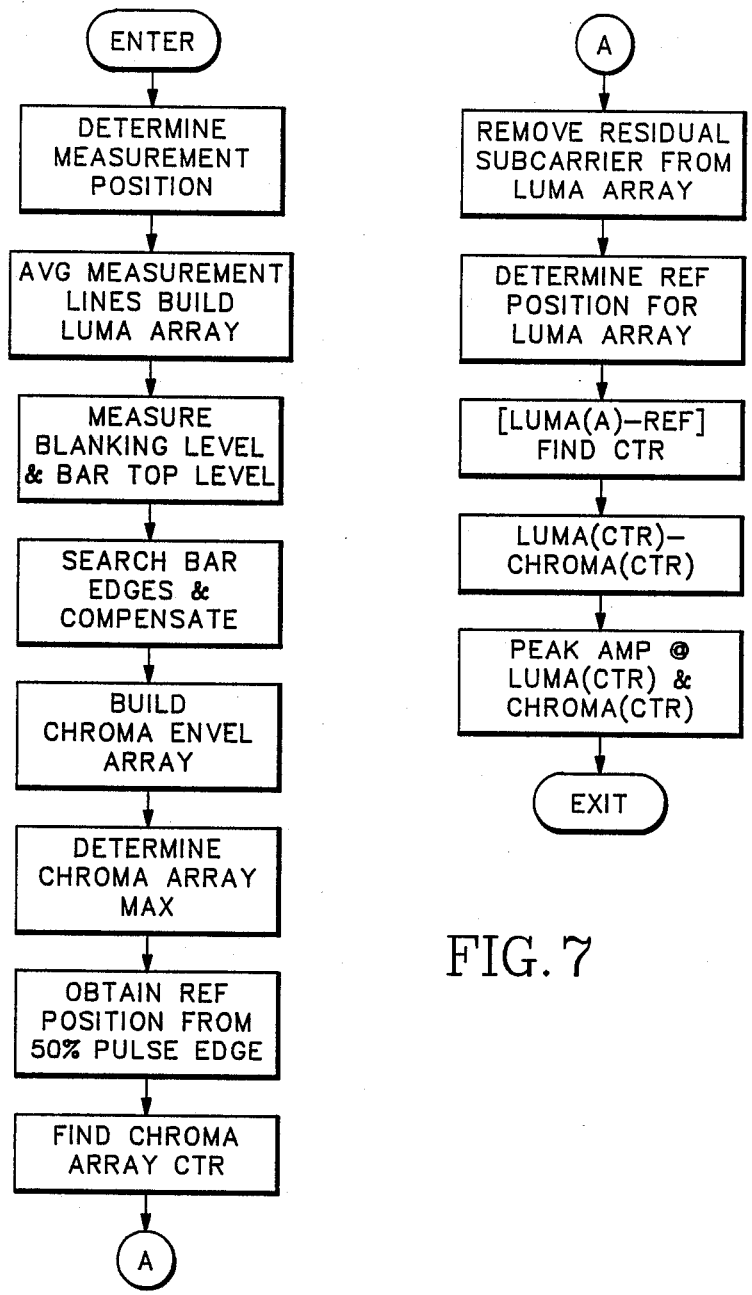
FIG. 7 is a flow chart diagram of a video level measurement module for the method of the present invention.

Once the data is transferred to the RAM 24 a video level module, as shown in FIG. 7, is accessed and the approximate position of the modulated pulse waveform is determined according to the type of the test signal. For the multiple line acquisition mode the lines are summed and averaged to provide a luminance array of data samples, the values to be averaged being determined from the start of each horizontal line as indicated by the address array. Then the zero and 100 percent reference levels are established from the blanking level of the horizontal line of data and from the top of the bar waveform, respectively. The edges of the bar waveform are determined and used to more precisely fix the position of the modulated pulse waveform. Using a demodulation function the chrominance envelope is determined from the modulated pulse waveform to form a chrominance array. The maximum point of the chrominance array is found, and then the 50% down points on each side are found to establish a half amplitude down (HAD) pulse width. The HAD pulse width is used to establish a range of data values between a starting reference point and an ending reference point that occur one HAD pulse width before and after the beginning and ending of the modulated pulse waveform. Any difference in amplitude between the level of the reference points and the blanking level is subtracted from the data values in the chrominance array.

The center of the chrominance array between the reference points is determined using an integrative technique. The minimum and maximum values of the integrated chrominance array are determined near the respective reference points, and the fifty percent down point is established as the center point for the chrominance array. Likewise the luminance array, after the removal of any residual subcarrier by summing alternate data samples, if necessary, is processed in the same manner as the chrominance array. The HAD points of the modulated pulse width for the luminance array are determined to derive the reference points, the value of the blanking level is subtracted from the luminance array values and the center of the array is determined.

Figure 8A:
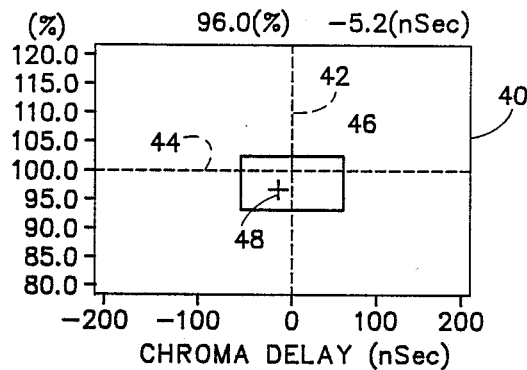
FIGS. 8(a) and 8(b) are plan views of displays resulting from the method of the present invention.
Figure 8B:
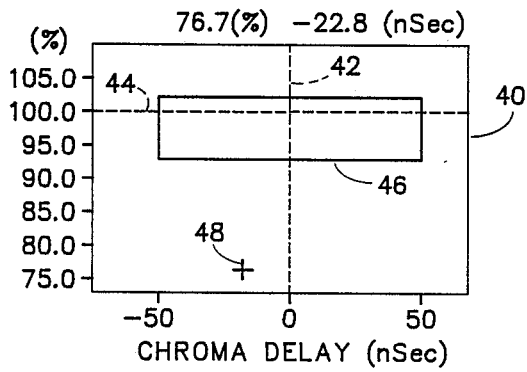

Chrominance to luminance delay is then determined by obtaining the difference between the centers of the luminance and chrominance arrays and converting it to nanoseconds for a precise value. Likewise the chrominance to luminance gain is determined by obtaining the peak values for the respective center points and obtaining the ratio of the chrominance peak to the luminance peak. These values are then displayed by a display module both numerically and graphically on the screen 32 as shown in FIGS. 8(a) and 8(b). The graphical display appears as a rectangular window 40 on the screen 32 with gain as a percentage along the Y-axis and delay as a time in nanoseconds along the X-axis. Nominal cursors 42, 44, shown as dotted lines, indicate the zero delay and gain levels, and a user specific tolerance box 46 is included within the window to indicate the range of allowable gain and delay values. The actual chrominance to luminance gain and delay measurement appears as a crosshair 48 at the location within the window corresponding to the calculated values. In FIG. 8(a) the gain and delay values are within established tolerances, while in FIG. 8(b) the gain and delay values are outside established tolerances. The respective scales for the window 40 may be varied to appropriately display the resulting measured gain and delay values. The disclosed values may be instantaneous values or may be averaged values to reduce noise as desired by the operator.

Thus the present invention provides a method for measuring and displaying precisely chrominance to luminance gain and delay resulting from the differences in the luminance and chrominance channels of a video device or system by establishing from the modulated pulse and bar waveforms of an appropriate test signal luminance and chrominance arrays. The centers of the arrays are used to determine the delay between the chrominance and luminance components, and the peaks at the centers are used to determine the gain difference between the chrominance and luminance components with the results being displayed both numerically and graphically on a display having rectangular coordinates corresponding to percentage amplitude and to time delay between chrominance and luminance components.

What is claimed is:

1. A method for displaying chrominance to luminance gain and delay values comprising the steps of:
   selecting a desired portion of digitized video data containing a specified test signal from an acquisition memory containing a field of the digitized video data for processing;
   locating a specific waveform within the specified test signal;
   building a luminance array and a chrominance array from the digitized video data representing the specific waveform;
   computing from the luminance and chrominance arrays said chrominance to luminance gain and delay values; and
   displaying the computed chrominance to luminance gain and said delay values on a graphic display having rectangular coordinates, one coordinate representing a percentage ratio of said chrominance to luminance gain and the other coordinate representing a time for the chrominance to luminance delay.

2. A method as recited in claim 1 wherein the displaying step comprises the steps of:
   graphically displaying a rectangular coordinate system on a display screen having time representing chrominance to luminance delay along one axis and percentage representing said chrominance to luminance gain along the other axis;
   graphically displaying within the rectangular coordinate system a tolerance box representing acceptable chrominance to luminance delay and gain values with respect to nominal values; and
   displaying the computed chrominance to luminance delay and gain values as a crosshair within the rectangular coordinate system and as numerical values on the display screen.

* * * * *